United States Patent
Ishikawa

(10) Patent No.: US 12,049,012 B2
(45) Date of Patent: Jul. 30, 2024

(54) MOTION PATH GENERATION DEVICE, MOTION PATH GENERATION METHOD, AND NON-TRANSITORY TANGIBLE COMPUTER READABLE STORAGE MEDIUM

(71) Applicant: DENSO CORPORATION, Kariya (JP)

(72) Inventor: Shota Ishikawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 253 days.

(21) Appl. No.: 17/363,462

(22) Filed: Jun. 30, 2021

(65) Prior Publication Data
US 2022/0001536 A1    Jan. 6, 2022

(30) Foreign Application Priority Data
Jul. 2, 2020 (JP) ................................ 2020-115042

(51) Int. Cl.
B25J 9/16 (2006.01)

(52) U.S. Cl.
CPC ........... *B25J 9/1666* (2013.01); *B25J 9/1653* (2013.01); *B25J 9/1664* (2013.01); *G05B 2219/40428* (2013.01); *G05B 2219/40429* (2013.01)

(58) Field of Classification Search
CPC ...... B25J 9/1666; B25J 9/1653; B25J 9/1664; G05B 2219/40428; G05B 2219/40429; G05B 2219/40477
See application file for complete search history.

(56) References Cited

U.S. PATENT DOCUMENTS

| | | | |
|---|---|---|---|
| 2011/0106306 A1* | 5/2011 | Kim | B25J 9/1664 901/1 |
| 2015/0239121 A1 | 8/2015 | Takeda | |
| 2017/0129100 A1 | 5/2017 | Takeda | |
| 2017/0361464 A1* | 12/2017 | Sasaki | B25J 9/1687 |
| 2021/0154831 A1* | 5/2021 | Kimura | B25J 9/1664 |
| 2021/0213606 A1 | 7/2021 | Suzumura et al. | |
| 2022/0379473 A1* | 12/2022 | Yamauchi | G05B 19/4093 |

FOREIGN PATENT DOCUMENTS

| | | |
|---|---|---|
| JP | 2002-073130 A | 3/2002 |
| JP | 5775279 B | 9/2015 |
| JP | 5998816 B2 * | 9/2016 |

OTHER PUBLICATIONS

Zhang, J., et al., "Guided RRT: A Greedy Search Strategy for Kinodynamic Motion Planning," Dec. 2014, IEEE, 2014 13th International Conference on Control, Automation, Robotics & Vision, pp. 480-485 (Year: 2014).*

Zhang, Haojian, et al. "Path Planning of Industrial Robot Based on Improved RRT Algorithm in Complex Environments." IEEE Access 6 (2018):53296-53306.

* cited by examiner

*Primary Examiner* — Abby Y Lin
*Assistant Examiner* — Karston G. Evans
(74) *Attorney, Agent, or Firm* — MASCHOFF BRENNAN

(57) ABSTRACT

A motion path generation device generates a motion path of a robot that has a plurality of joints and a plurality of shafts. Adjacent two of the plurality of shafts are connected by a corresponding one of the plurality of joints. The motion path generation device generates a via point candidate that is a candidate of a next via point to be connected to a parent via point. The motion path generation device adds the via point candidate as a new via point in response to determining that the via point candidate does not interfere with an obstacle.

8 Claims, 14 Drawing Sheets

FIG. 6
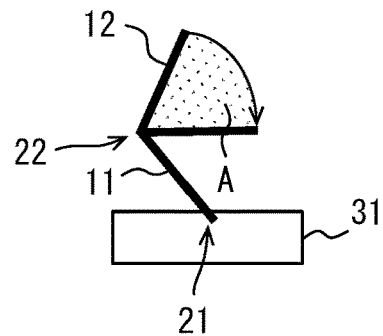
FIG. 7
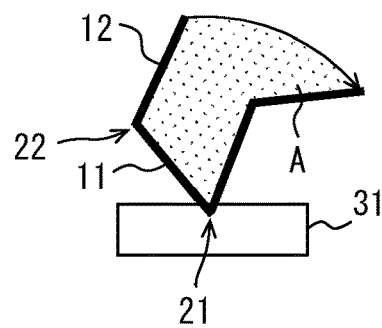
FIG. 8
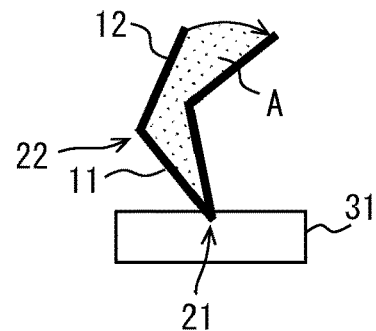
FIG. 9
(EQUATION 1) $$SA = \sum_{k=1}^{N}\left(\frac{1}{2}\left(\sum_{j=1}^{k} Lj\right)^2 |\delta\theta_k|\right)$$

MOTION PATH GENERATION DEVICE, MOTION PATH GENERATION METHOD, AND NON-TRANSITORY TANGIBLE COMPUTER READABLE STORAGE MEDIUM

CROSS REFERENCE TO RELATED APPLICATIONS

This application is based on Japanese Patent Application No. 2020-115042 filed on Jul. 2, 2020, the disclosure of which is incorporated herein by reference.

TECHNICAL FIELD

The present disclosure relates to a motion path generation device, motion path generation method, and non-transitory tangible computer readable storage medium for generating a motion path of a robot having multiple joints.

BACKGROUND

Devices that generate robot motion paths are known. One of the devices determines interference in a process of probabilistically generating a motion path, and adjusts a search direction for generating a new via point based on the result of interference determination.

SUMMARY

The present disclosure provides a motion path generation device. The motion path generation device generates a motion path of a robot that has a plurality of joints and a plurality of shafts. Adjacent two of the plurality of shafts are connected by a corresponding one of the plurality of joints. The motion path generation device generates a via point candidate that is a candidate of a next via point to be connected to a parent via point. The motion path generation device adds the via point candidate as a new via point in response to determining that the via point candidate does not interfere with an obstacle.

BRIEF DESCRIPTION OF DRAWINGS

The features and advantages of the present disclosure will become more apparent from the following detailed description made with reference to the accompanying drawings. In the drawings:

FIG. 6 is a diagram showing a movement area A when a second joint is changed by a specified maximum angle;
FIG. 7 is a diagram showing a movement area A when a first joint is changed by a specified maximum angle;
FIG. 8 is a diagram in which an angle of the first joint is changed so as to be a maximum movement amount;
FIG. 9 is a diagram showing Equation 1 for calculating a movement amount.

DETAILED DESCRIPTION

Figure 1:
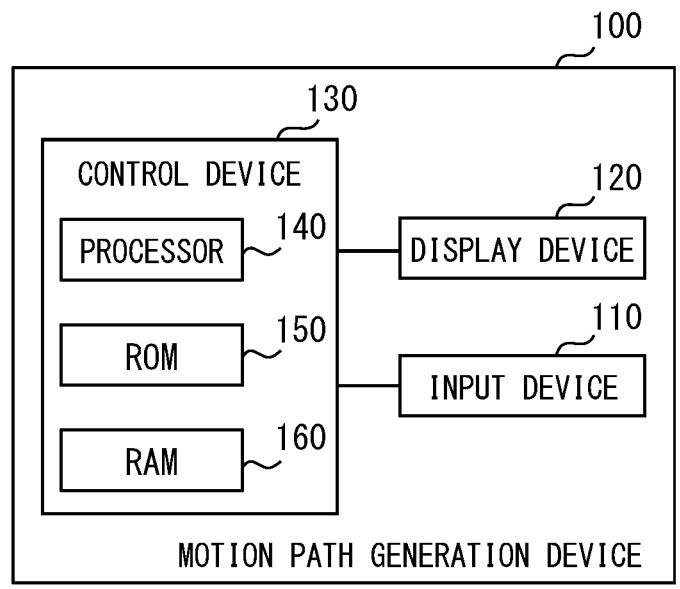
FIG. 1 is a diagram showing a configuration of a motion path generation device according to a first embodiment.

For example, in a device, which generates robot motion paths and determines interference in a process of probabilistically generating a motion path, generation of the motion path is gradually improved based on the result of interference determination. Therefore, the path cannot be efficiently generated until a large number of the results of interference determination are obtained.

The present disclosure provides a motion path generation device, a motion path generation method, and non-transitory tangible computer readable storage medium each of which efficiently generates a motion path of a robot.

An exemplary embodiment of the present disclosure provides a motion path generation device. The motion path generation device generates a motion path of a robot that has a plurality of joints and a plurality of shafts. Adjacent two of the plurality of shafts are connected by a corresponding one of the plurality of joints. The motion path generation device includes a parent via point selection unit, a search area setting unit, a via point candidate generation unit, an interference determination unit, and a via point addition unit. The parent via point selection unit selects, from a predetermined via point, a parent via point that is a source for searching for a next via point in a joint space. Each axis of the joint space defines an angle of each of the plurality of joints. An attitude of the robot being represented by a coordinate in the joint space. The search area setting unit sets a search area for searching for the next via point. The via point candidate generation unit randomly generates a via point candidate that is a candidate of the next via point to be connected to the parent via point. The interference determination unit determines whether the via point candidate interferes with an obstacle. The via point addition unit adds the via point candidate as a new via point when the interference determination unit does not determine that the via point candidate interferes with the obstacle. The search area setting unit sets the search area in the joint space by setting a change angle range of each of the plurality of joints such that an amount of movement of all of the plurality of shafts does not exceed a maximum movement amount. The maximum movement amount is defined as an amount of movement of at least one of the plurality of shafts which is smaller than a maximum possible movement amount. The maximum possible movement amount is an amount of movement of all of the plurality of shafts when each of the plurality of joints changes by a specified maximum angle.

Another exemplary embodiment of the present disclosure provides a motion path generation method. The motion path generation method generates a motion path of a robot that has a plurality of joints and a plurality of shafts. Adjacent two of the plurality of shafts are connected by a corresponding one of the plurality of joints. The motion path generation method includes: selecting, from a predetermined via point, a parent via point that is a source for searching for a next via point in a joint space, each axis of the joint space defining an angle of each of the plurality of joints, an attitude of the robot being represented by a coordinate in the joint space; setting a search area for searching for the next via point; randomly generating a via point candidate that is a candidate of the next via point to be connected to the parent via point; determining whether the via point candidate interferes with an obstacle; and adding the via point candidate as a new via point in response to determining that the via point candidate does not interfere with the obstacle. The setting of the search area in the joint space includes setting of a change angle range of each of the plurality of joints such that an amount of movement of all of the plurality of shafts does not exceed a maximum movement amount. The maximum movement amount is defined as an amount of movement of at least one of the plurality of shafts which is smaller than a maximum possible movement amount. The maximum possible movement amount is an amount of movement of all of the plurality of shafts when each of the plurality of joints changes by a specified maximum angle.

Another exemplary embodiment of the present disclosure provides a non-transitory tangible computer readable storage medium. The non-transitory tangible computer readable storage medium includes instructions executed by a processor of a motion path generation device. The motion path generation device generates a motion path of a robot that has a plurality of joints and a plurality of shafts. Adjacent two of the plurality of shafts is connected by a corresponding one of the plurality of joints. The instructions includes: selecting, from a predetermined via point, a parent via point that is a source for searching for a next via point in a joint space, each axis of the joint space defining an angle of each of the plurality of joints, an attitude of the robot being represented by a coordinate in the joint space; setting a search area for searching for the next via point; randomly generating a via point candidate that is a candidate of the next via point to be connected to the parent via point; determining whether the via point candidate interferes with an obstacle; and adding the via point candidate as a new via point in response to determining that the via point candidate does not interfere with the obstacle. The setting of the search area in the joint space includes setting of a change angle range of each of the plurality of joints such that an amount of movement of all of the plurality of shafts does not exceed a maximum movement amount. The maximum movement amount is defined as an amount of movement of at least one of the plurality of shafts which is smaller than a maximum possible movement amount. The maximum possible movement amount is an amount of movement of all of the plurality of shafts when each of the plurality of joints changes by a specified maximum angle.

The motion path generation device randomly sets the via point candidate in the search area. Thus, possibility that a via point candidate interferes with an obstacle becomes high when the search area is large. That is, when an interference area is large, the generated via point candidate may interfere with the obstacle and cannot be added to the via point. Thus, the calculation may be waste.

In the exemplary embodiment of the present disclosure, the motion path generation device sets the maximum movement amount that is the upper limit for the movement amount of all shafts when the angle of each joint changes. The maximum movement amount for the search is defined as the amount of movement for the plurality of shafts smaller than the maximum possible movement amount. The maximum possible movement amount is an amount of movement for the plurality of shafts when each of the plurality of joints changes by a specified maximum angle. The search area is the change angle area of the joints in which the movement amount of each shaft does not exceed the maximum movement amount.

Thus, the search area can be narrowed as compared with the case where the search area is an area where each joint changes by a predetermined maximum angle. The size of the search area is considered to be proportional to the interference probability. Therefore, by narrowing the search area, the configuration can reduce the possibility that the via point candidate Q interferes with the obstacle. Thus, the possibility that the calculation is wasted is reduced. By reducing unnecessary calculations, the configuration can efficiently search for a motion path.

First Embodiment

Hereinafter, embodiments will be described with reference to the drawings. FIG. 1 is a diagram showing a configuration of a motion path generation device 100 according to a first embodiment. The motion path generation device 100 is, for example, a device that generates a motion path for a robot 10 shown in FIG. 2. The motion path means a time change of an attitude of the robot 10.

Figure 2:
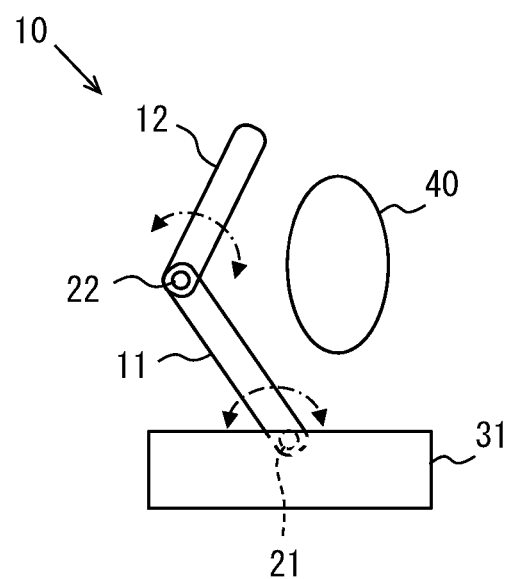
FIG. 2 is a diagram showing a robot that is a target for generating a motion path.

The robot 10 shown in FIG. 2 includes two shafts, that is, a first shaft 11 and a second shaft 12, and two joints, that is, a first joint 21 and a second joint 22. The robot 10 has a simplified configuration for explaining the first embodiment. The number of shafts and the number of joints may be three or more.

The first joint 21 is located at one end of the first shaft 11 and causes the first shaft 11 to be rotatable around a rotation axis orthogonal to the first shaft 11. The first shaft 11 is connected to the base 31 by the first joint 21 so as to be rotatable relative to the base 31. The base 31 is installed on a floor or an installation base.

The second joint 22 is located at the other end of the first shaft 11. The second joint 22 connects the other end of the first shaft 11 and one end of the second shaft 12, and causes the second shaft 12, for the first shaft 11, to be rotatable around a rotation axis orthogonal to the first shaft 11 and the second shaft 12. In FIG. 2, each of the first shaft 11 and the second shaft 12 has a rod shape. However, each of the first shaft 11 and the second shaft 12 do not have a rod shape, and each shape may be variously changed according to the application of the robot 10.

The range in which the first shaft 11 rotates relative to the base 31 and the range in which the second shaft 12 rotates relative to the first shaft 11 may be set based on the mechanical mechanism or the electrical mechanism.

FIG. 2 shows an obstacle 40. The obstacle 40 is an object that becomes an obstacle when the first shaft 11 or the second shaft 12 moves, and the shape and position of the obstacle 40 differ based on the position where the robot 10 is installed.

Return to the description of FIG. 1. The motion path generation device 100 includes an input device 110, a display device 120, and a control device 130. The control device 130 includes a processor 140, a ROM 150, and a RAM 160. The motion path generation device 100 having such a configuration can also be realized by a general-purpose computer.

The input device 110 is a keyboard or the like, and can be used for inputting the structure of the robot 10 and the position of the obstacle 40. The structure of the robot 10 includes the length and width of the first shaft 11 and the second shaft 12, the position of the first joint 21, the position of the second joint 22 relative to the first shaft 11 and the second shaft 12, and the like. The position of the obstacle 40 is identified by the space in which the obstacle 40 exists by the coordinate. The display device 120 is capable of displaying the motion path generated by the control device 130.

The ROM 150, which is a non-volatile storage medium, stores a motion path generation program executed by the processor 140. The processor 140 executes each unit shown in FIG. 3 by executing the motion path generation program stored in the ROM 150 while using the temporary storage function of the RAM 160. The fact that the processor 140 executes each unit shown in FIG. 3 means that the motion path generation method corresponding to the motion path generation program is executed.

Figure 3:
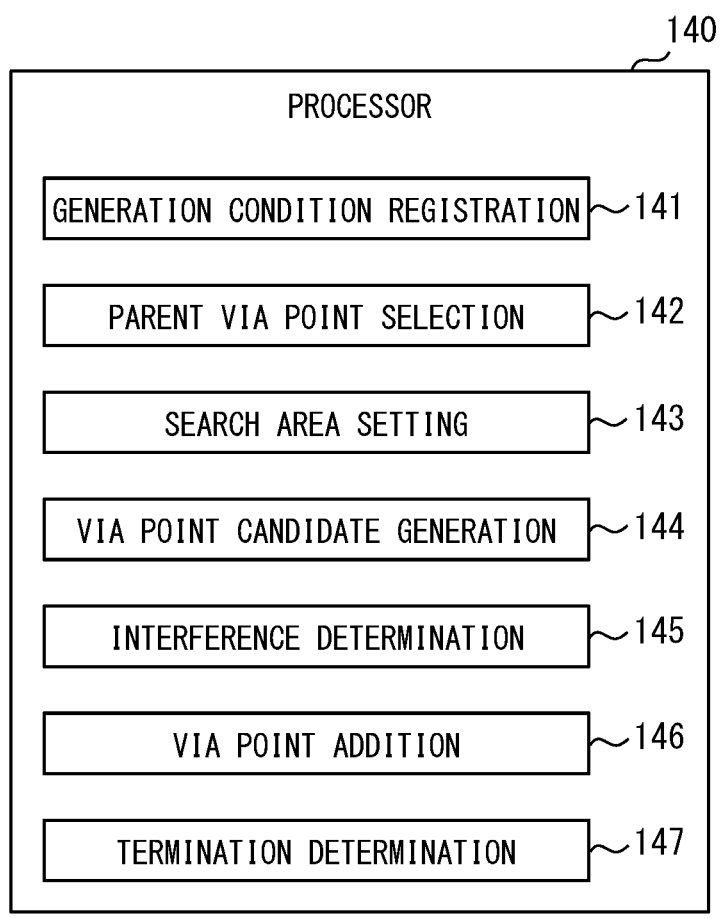
FIG. 3 is a block diagram showing a function executed by a processor of FIG. 1.

As shown in FIG. 3, the processor 140 includes a generation condition registration unit 141, a parent via point selection unit 142, a search area setting unit 143, a via point candidate generation unit 144, an interference determination unit 145, a via point addition unit 146, and a termination determination unit 147. The process executed by these units will be described with reference to the flowchart shown in FIG. 4.

Figure 4:
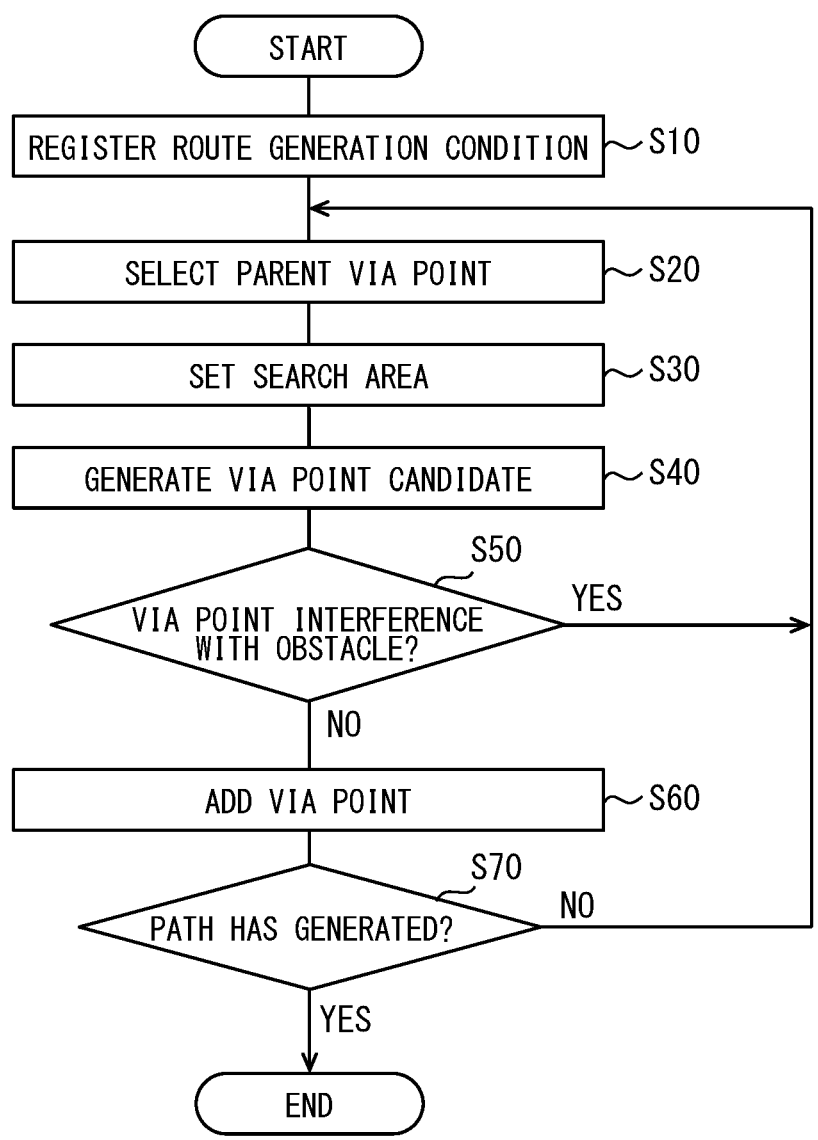
FIG. 4 is a flowchart showing processing to be executed by the processor of FIG. 1.

The flowchart shown in FIG. 4 is started by a start operation of a person who uses the motion path generation device 100. By executing the flowchart shown in FIG. 4, a motion path can be generated in the joint space.

Figure 5:
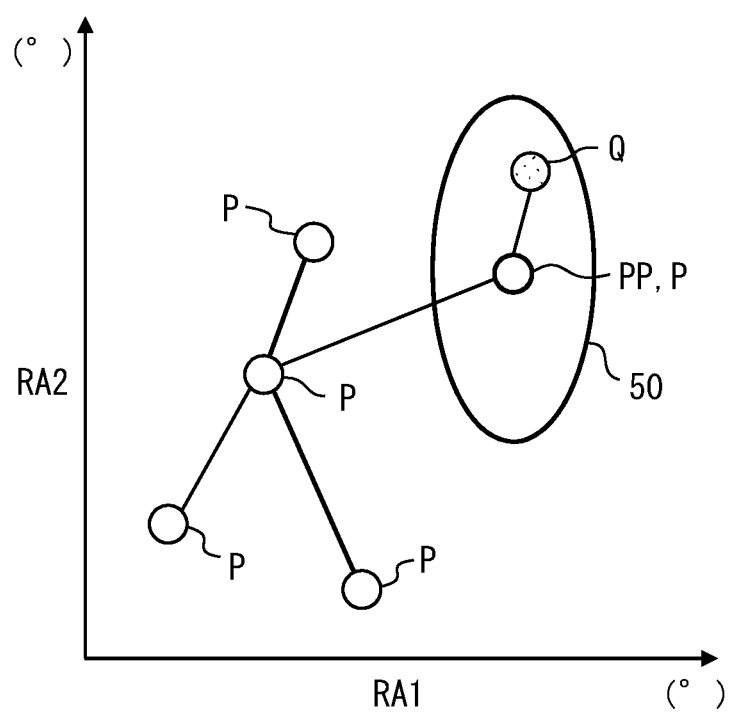
FIG. 5 is a diagram showing a joint space.

The joint space is a coordinate space defined by the dimension of the number of joints possessed by the robot 10. Since the robot 10 of the present embodiment has two joints 21 and 22, the joint space has a two-dimensional coordinate system as shown in FIG. 5. In FIG. 5, the horizontal axis indicates the angle RA1 of the first joint 21, and the vertical axis indicates the angle RA2 of the second joint 22.

The angle RA1 of the first joint 21 can also be considered as an angle of the first shaft 11 with respect to the base 31. The angle RA2 of the second joint 22 can also be considered as an angle of the second joint 22 with respect to the first joint 21. Since the attitude of the robot 10 can be expressed by the joint angle RA, the attitude of the robot 10 is determined by determining the coordinate in the joint space.

S10 is a process executed by the generation condition registration unit 141. In S10, the path generation conditions are registered. The user registers the path generation conditions using the input device 110. The path generation condition include the structure of the robot 10, the position of the obstacle 40, the path generation start point, and the path generation end point. In the process shown in FIG. 4, a via point is also added. However, a via point P (see FIG. 5) may be added in advance. That is, it is possible to set in advance where the points do not interfere with the obstacle 40, independent of the path.

In S20, which is a process executed by the parent via point selection unit 142, the parent via point PP is selected. The parent via point PP is randomly selected from the already determined via points P. FIG. 5 shows the parent via point PP and the four via points P. The parent via point PP is also one of the via points P. Including the parent via point PP, there are five via points P in the example of FIG. 5. A parent via point PP is randomly selected from these five via points P. When there is no via point P, a predetermined start point such as a path generation start point is set as the parent via point PP.

In S30, which is a process executed by the search area setting unit 143, the search area 50 is set. The search area 50 is an area in the joint space for searching for a new via point P connected to the parent via point PP. The search area 50 shown in FIG. 5 is an elliptical area centered on the parent via point PP.

The calculation when the search area 50 is set will be described with reference to FIGS. 6, 7, and 8. FIG. 6 shows a movement area A of all shafts when the first joint 21 is fixed and the second joint 22 is rotated by a specified maximum angle. The size of the movement area A indicates the amount of movement of all shafts, that is, the first shaft 11 and the second shaft 12 in the two-dimensional coordinate system. In the following, the size of the movement area A may be referred to as a movement amount SA.

The specified maximum angle can be the maximum change angle possible due to mechanical constraints. Alternatively, the specified maximum angle may be determined from the following viewpoints. That is, the specified maximum angle may be determined from the viewpoint of limiting the distance between two adjacent via points P in the joint space when the motion path is set.

When the specified maximum angle is too large, the motion path becomes too coarse, and there is a high possibility that it is determined that the path does not interfere with the obstacle 40 even though the path interferes with the obstacle 40. Therefore, the specified maximum angle is set so that the motion path does not become too coarse. The specific maximum angle may be determined based on experiments and the like. For example, the specified maximum angle is 60°.

FIG. 7 shows a case where the second joint 22 is fixed and the first joint 21 is rotated by the specified maximum angle. Compared with FIG. 6, the movement area A becomes larger when the first joint 21 is rotated even though the first joint 21 is rotated by the same specified maximum angle. In other words, when the first joint 21 and the second joint 22 are compared, the first joint 21 has larger movement amount for the all shafts (that is, the first shaft 11 and the second shaft 12) per unit change angle than the second joint 22.

The larger the movement area A is, the higher the probability that the obstacle 40 will enter the movement area A is. The entry of the obstacle 40 into the movement area A indicates that the first shaft 11 or the second shaft 12 interferes with the obstacle 40. A via point P at which the first shaft 11 or the second shaft 12 interferes with the obstacle 40 cannot be included in the motion path. Therefore, the calculation of the via point P at which the first shaft 11 or the second shaft 12 interferes with the obstacle 40 indicates that the calculation is wasted.

In order to reduce such useless calculation, the second joint 22 is used as a reference joint. The reference joint is a joint, among a plurality of joints 21 and 22, in which the movement amount SA of all shafts per unit change angle is not the maximum. In the present embodiment, since there are two joints, the second joint 22 serves as the reference joint.

In S30, the size of the movement area A when the second joint 22, which is the reference joint, is moved by the specified maximum angle and the other joint, that is, the first joint 21 is fixed is set as the maximum movement amount at the time of searching for a via point. In S30, a change angle range of the first joint 21 and a change angle range of the second joint 22 are determined so that the size of the movement area A when only the first joint 21 or both the first joint 21 and the second joint 22 are changed does not exceed the maximum movement amount. The change angle range is a range in each axis of the joint space for determining the search area 50.

FIG. 8 shows the attitudes of the shafts before and after the angle change when only the first joint 21 is changed in angle and the second joint 22 is fixed so that the size of the movement area A becomes the same as the area in FIG. 6. The amount of change in the angle of the first shaft 11 in FIG. 8 is smaller than the amount of change in the angle of the second shaft 12 shown in FIG. 6.

The size of the movement area A, that is, the movement amount SA is calculated using, for example, Equation 1 shown in FIG. 9. In Equation 1, N is the number of joints, Lj is the length from joint j to j+1, and δθk is the amount of movement of the kth joint.

As can be seen from the comparison of FIGS. 6 and 8, the movement area A per unit change angle is larger in the first joint 21 even when the change angle is the same. Therefore, the angle change area of the first joint 21 is narrower. Therefore, as shown in FIG. 5, the search area 50 is a vertically long ellipse. The search area 50 has the range of the angle RA1 of the first joint 21 to be changed narrower than the range of the angle RA2 of the second joint 22 to be changed.

In S40, which is a process executed by the via point candidate generation unit 144, the via point candidate Q is generated. The via point candidate Q is randomly generated in the search area 50 set in S30.

In S50, which is a process executed by the interference determination unit 145, when the attitude of the robot 10 is in the via point candidate Q generated in S40, it is determined whether the robot 10 do not interfere with the obstacle 40. When the robot 10 and the obstacle 40 do not interfere with each other, the determination result of S50 becomes NO and the process proceeds to S60. In S60, which is a process executed by the via point addition unit 146, the via point candidate Q generated in S40 is added to the via point P. Thereafter, the process proceeds to S70.

In S70, which is a process executed by the termination determination unit 147, it is determined whether the path generation is completed. For example, when the search area 50 centered on the via point P added in S60 is set and the search area 50 includes the path generation end point, the via point P and the path generation end point are connected and the path generation is completed.

After connecting the path generation start point and the path generation end point with a plurality of via points P, a surplus via point P may be deleted or a plurality of via points P may be integrated from the path between the path generation start point and the path generation end point using various methods. The process of simplifying the motion path after connecting the path generation start point and the path generation end point with a plurality of via points P is not the subject of the present disclosure, and will not be described further.

Summary of First Embodiment

The motion path generation device 100 of the first embodiment described above sets the maximum movement amount, which is the upper limit for the movement amount SA of all shafts when the first joint 21 and the second joint 22 change their angles. In order to determine this maximum movement amount, the second joint 22 in which the movement amount SA of all shafts per unit change angle is relatively small is used as the reference joint. The movement amount SA, when the reference joint is changed by the specified maximum angle and the first joint 21 is fixed, is defined as the maximum movement amount. The change angle range of the first joint 21 and the change angle range of the second joint 22 are determined such that the movement amount SA of all shafts does not exceed the maximum movement amount. The search area is determined by the change angle range of the first joint 21 and the change angle range of the second joint 22.

With this configuration, the search area 50 can be narrowed as compared with the case where the search area 50 is the area where each of the first joint 21 and the second joint 22 changes by a predetermined maximum angle. The size of the search area 50 is considered to be proportional to the interference probability. Therefore, by narrowing the search area 50, the configuration can reduce the possibility that the via point candidate Q interferes with the obstacle 40. Thus, the possibility that the calculation is wasted is reduced. By reducing unnecessary calculations, the configuration can efficiently search for a motion path.

Second Embodiment

Next, a second embodiment will be described. In the description of the second and subsequent embodiments, elements having the same reference numerals as those used so far are identical to the elements having the same reference numerals in the previous embodiment(s), unless otherwise specified. When only a part of the configuration is described, the embodiment described above can be applied to other parts of the configuration.

Figure 10:
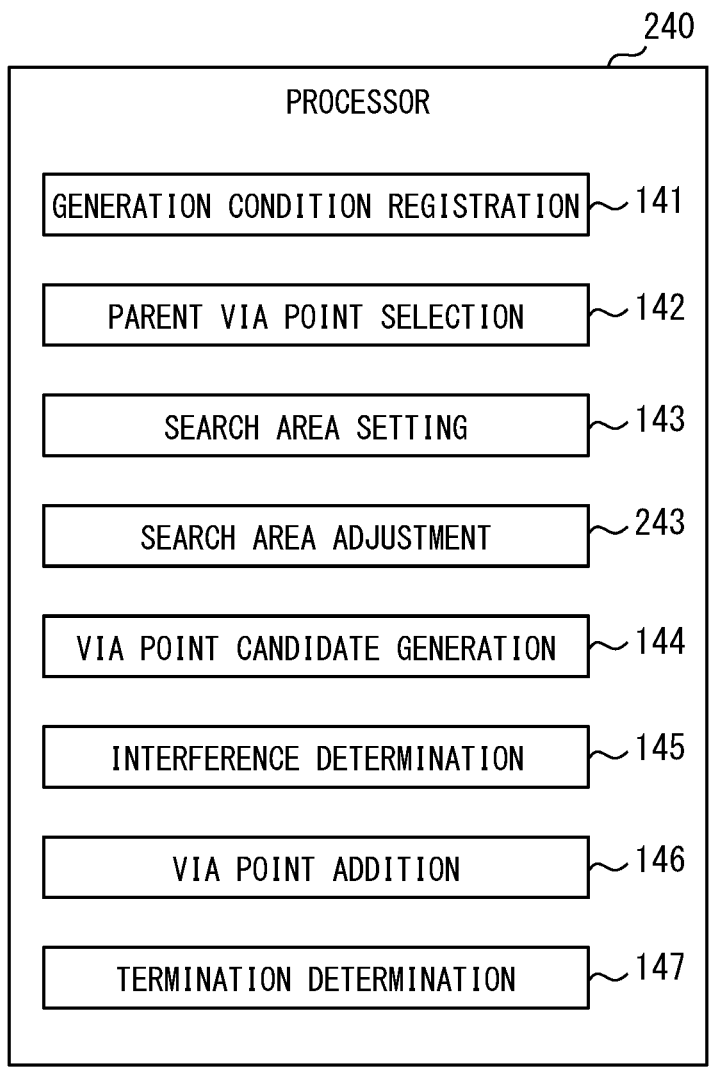
FIG. 10 is a block diagram showing a function executed by a processor according to a second embodiment.

FIG. 10 shows a function executed by a processor 240 of the second embodiment. The processor 240 is provided in a motion path generation device in place of the processor 140 of the first embodiment. The processor 240 is different from the processor 140 of the first embodiment in that a search area adjustment unit 243 is provided. The process executed by the search area adjustment unit 243 will be described with reference to FIG. 11.

Figure 11:
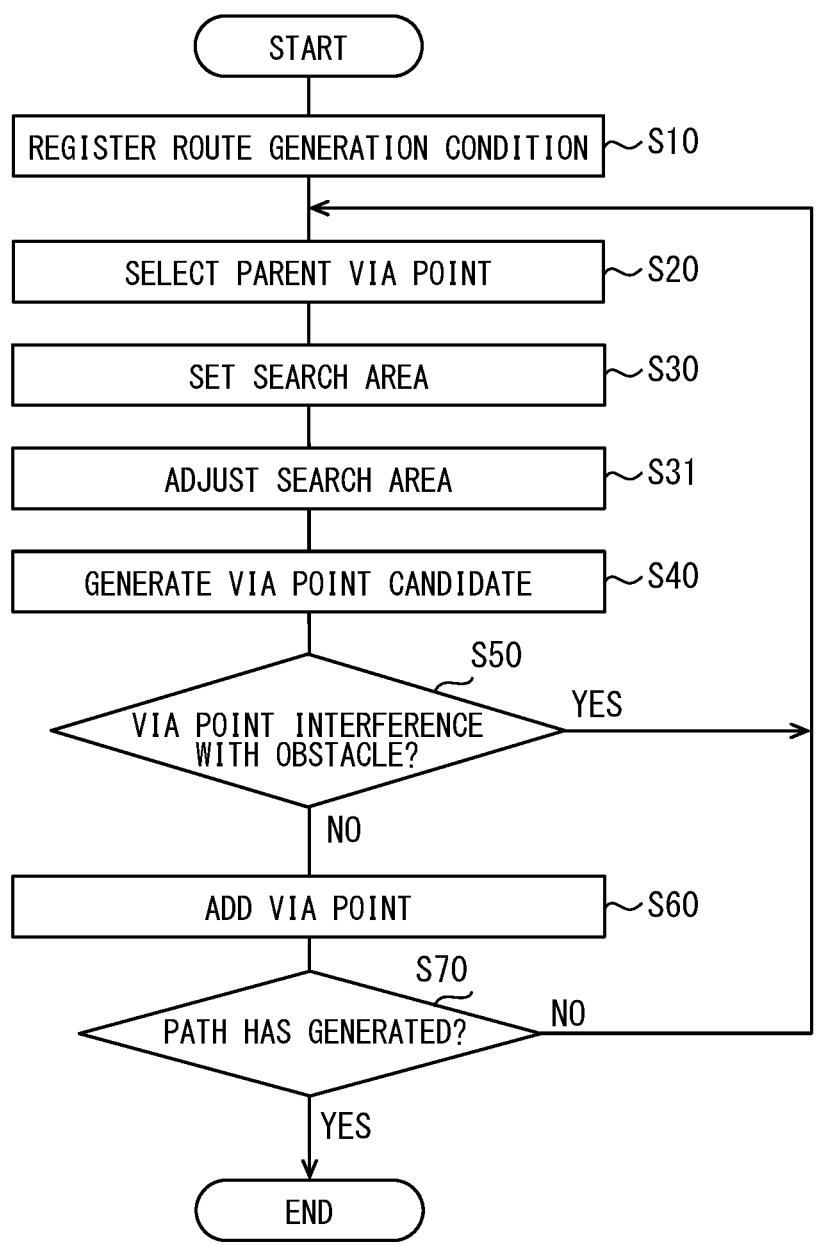
FIG. 11 is a flowchart showing processing to be executed by the processor of FIG. 10.

FIG. 11 is a flowchart showing processing to be executed by the processor 240. In the flowchart of FIG. 11, S31 is executed after executing S30. S31 is a process executed by the search area adjustment unit 243.

Figure 12:
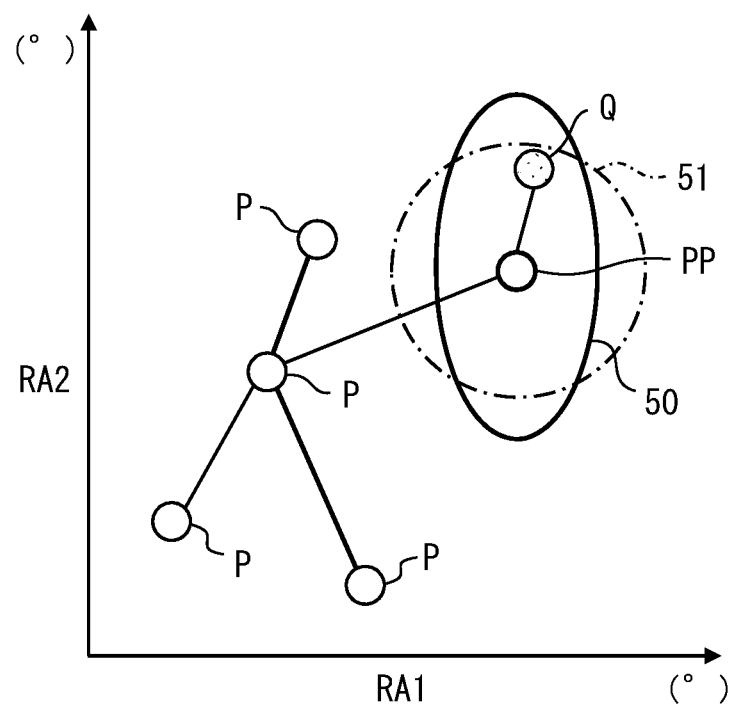
FIG. 12 is a diagram comparing a search area set in S30 of flowchart of FIG. 11 with a specified maximum area.

In S31, the search area 50 is adjusted when the search area 50 set in S30 can be changed in an angle exceeding the above-mentioned specified maximum angle. FIG. 12 shows a circular specified maximum area 51 having a specified maximum angle as a radius centered on the parent via point PP.

The search area 50 shown in FIG. 12 has portions outside the specified maximum area 51. The outer edge of the search area 50 is determined from the viewpoint that the movement amount SA is the maximum movement amount. When the change angle of the first joint 21 is small and the movement amount SA is set to the maximum movement amount, the change angle of the second joint 22 increases. Therefore, the search area 50 may have a portion outside the specified maximum area 51.

However, it is less necessary for the search area 50 to include a portion having a change angle larger than the specified maximum angle. Therefore, in S31, of the search area 50 set in S30, the portion outside the specified maximum area 51 is reduced. Specifically, it is preferable to exclude all the portions outside the specified maximum area 51 from the search area 50 set in S30. Alternatively, of the search area 50 set in S30, only a part of the portion outside the specified maximum area 51 may be excluded. For example, in the search area 50 shown in FIG. 12, there are upper and lower portions located outside the specified maximum area 51. Of these portions, only the upper side or only the lower side may be excluded.

In the following S40, the via point candidate Q is generated in the search area 50 after the adjustment in S31.

According to the second embodiment, the search area 50 set from the viewpoint of not exceeding the maximum movement amount is adjusted to exclude the portion exceeding the specified maximum area 51. As a result, it is less likely that the via point candidate Q is set in a portion where it is less necessary to set the via point P. Therefore, the configuration can search more efficiently.

Third Embodiment

Figure 13:
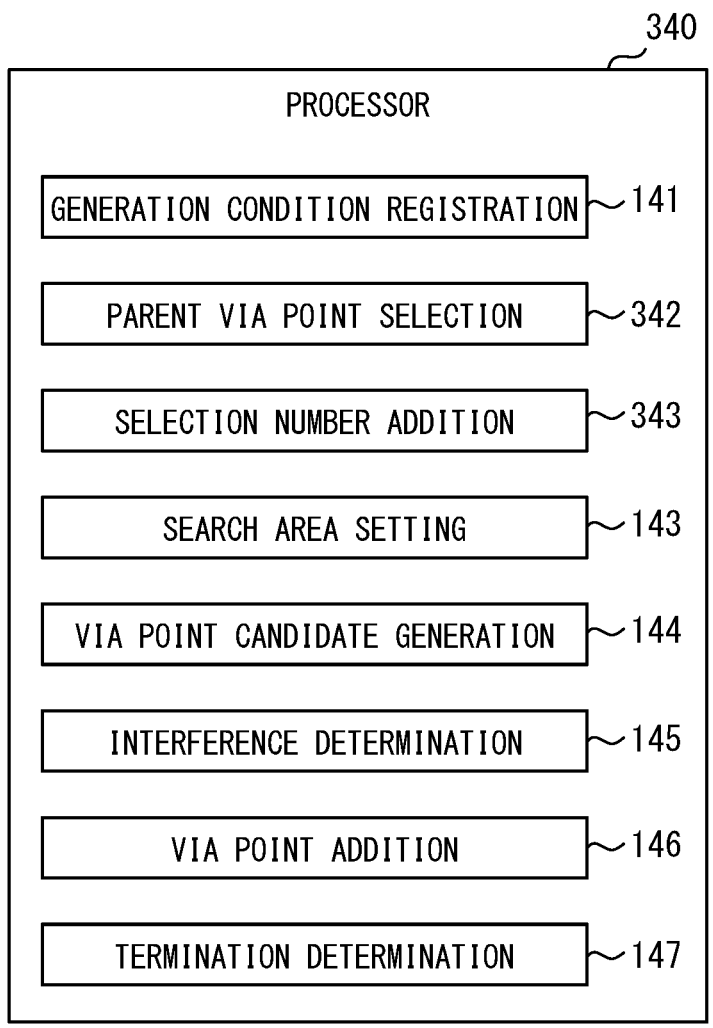
FIG. 13 is a block diagram showing a function executed by a processor according to a third embodiment.

FIG. 13 shows a function executed by a processor 340 of a third embodiment. The processor 340 is provided in a motion path generation device in place of the processor 140 of the first embodiment. The process executed by a parent via point selection unit 342 in the processor 340 is different from that of the parent via point selection unit 142 of the first embodiment. Further, the processor 340 includes a selection number addition unit 343. The processes executed by the parent via point selection unit 342 and the selection number addition unit 343 will be described with reference to FIG. 14.

Figure 14:
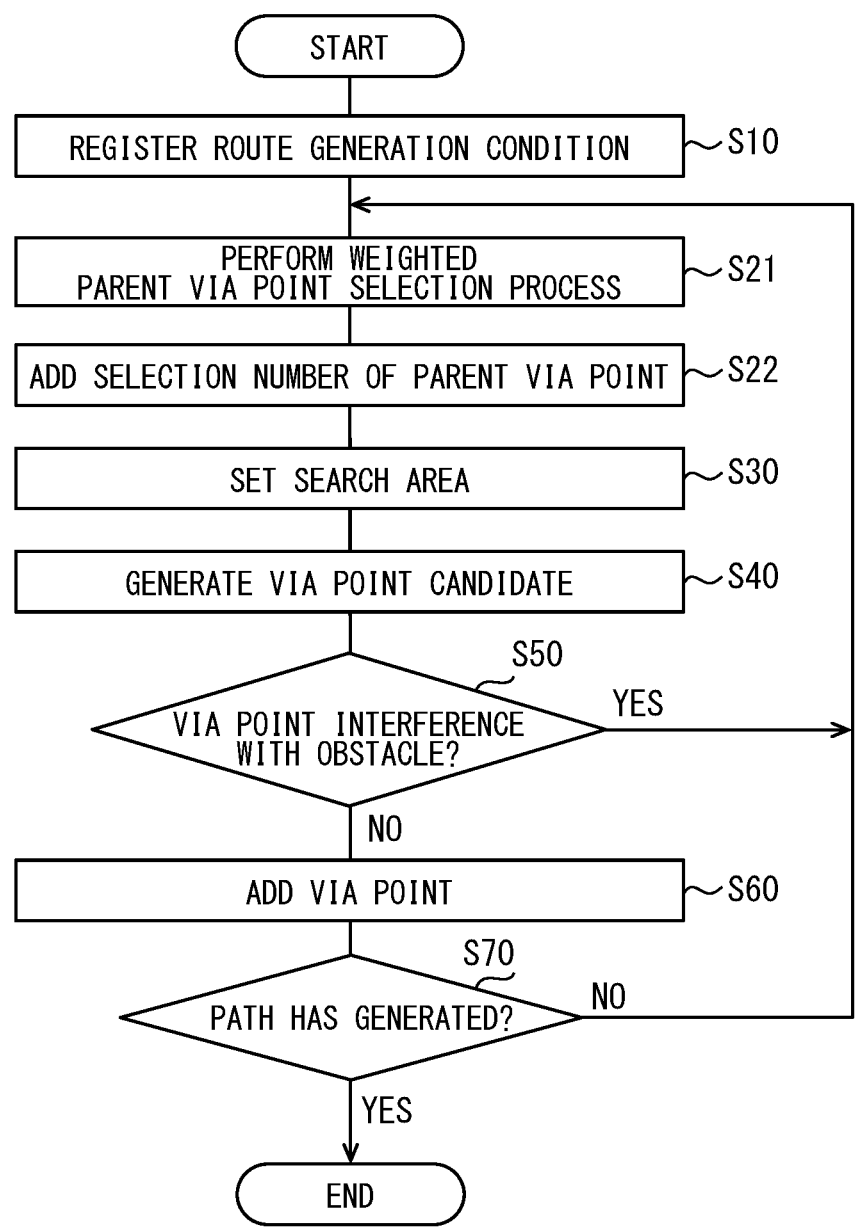
FIG. 14 is a flowchart showing processing to be executed by the processor of FIG. 13.

FIG. 14 is a flowchart showing processing to be executed by the processor 340. In the flowchart of FIG. 14, S21 is executed instead of S20 described in FIG. 4. S21 is a process executed by the parent via point selection unit 342.

In S21, a weighted parent via point selection process is executed. In S20 described in the first embodiment, when the parent via point PP is selected from the via points P, no process that makes it easy to select any of the via point P is executed. On the other hand, in S21, the higher the number of times the via point P is selected as the parent via point PP, the lower the probability of selecting the via point P as the parent via point PP is set.

Specifically, for each via point P, the reciprocal of the number obtained by adding 1 to the number of times selected as the parent via point PP is set as the weight. The parent via point PP is selected from all the via points P by weighted random sampling.

Figure 15:
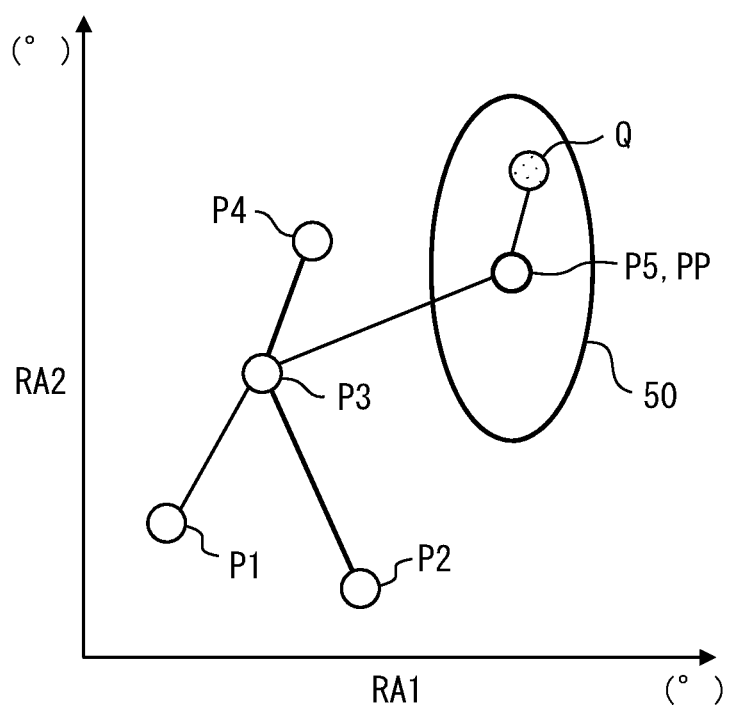
FIG. 15 is a diagram showing a process in which a processor selects a parent via point.

FIG. 15 shows five via points P of P1, P2, P3, P4, and P5. Of these via points P, it is assumed that the via point P3 is selected as the parent via point PP three times and the via point P5 is selected as the parent via point PP 0 times. In this case, the via point P3 has a weight of 1/4, and the via point P5 has a weight of 1/1. Because of this weight, the via point P5 is more likely to be selected as the parent via point PP than the via point P3.

After execution in S21, the process proceeds to S22. S22 is a process executed by the selection number addition unit 343. In S22, 1 is added to the number of times selected as the parent via point PP with respect to the via point P selected as the parent via point PP in S21.

In the third embodiment, the higher the number of times the via point P is selected as the parent via point PP, the lower the probability of selecting the via point P as the parent via point PP is set. With this configuration, the via point P can be expanded over a wide range.

Fourth Embodiment

Figure 16:
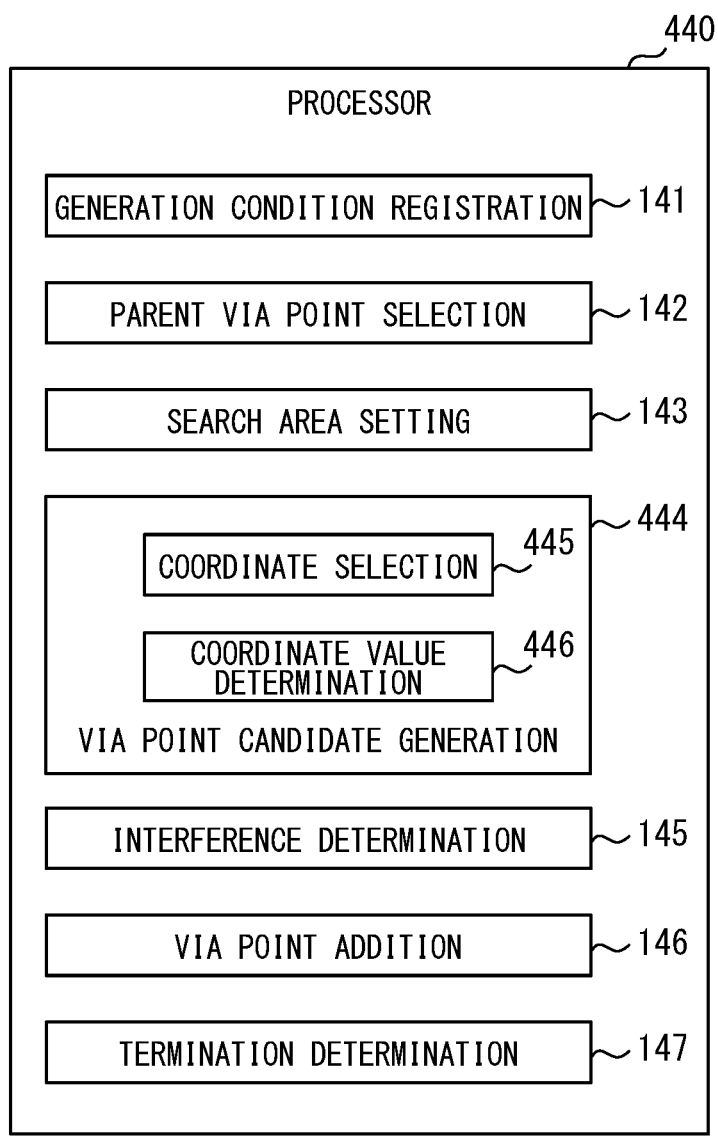
FIG. 16 is a block diagram showing a function executed by a processor according to a fourth embodiment.

FIG. 16 shows a function executed by a processor 440 of a fourth embodiment. The processor 440 is provided in a motion path generation device in place of the processor 140 of the first embodiment. The processor 440 includes a via point candidate generation unit 444 instead of the via point candidate generation unit 144. The via point candidate generation unit 444 includes a coordinate selection unit 445 and a coordinate value determination unit 446. The processes executed by the via point candidate generation unit 444, the coordinate selection unit 445, and the coordinate value determination unit 446 will be described with reference to FIG. 17.

Figure 17:
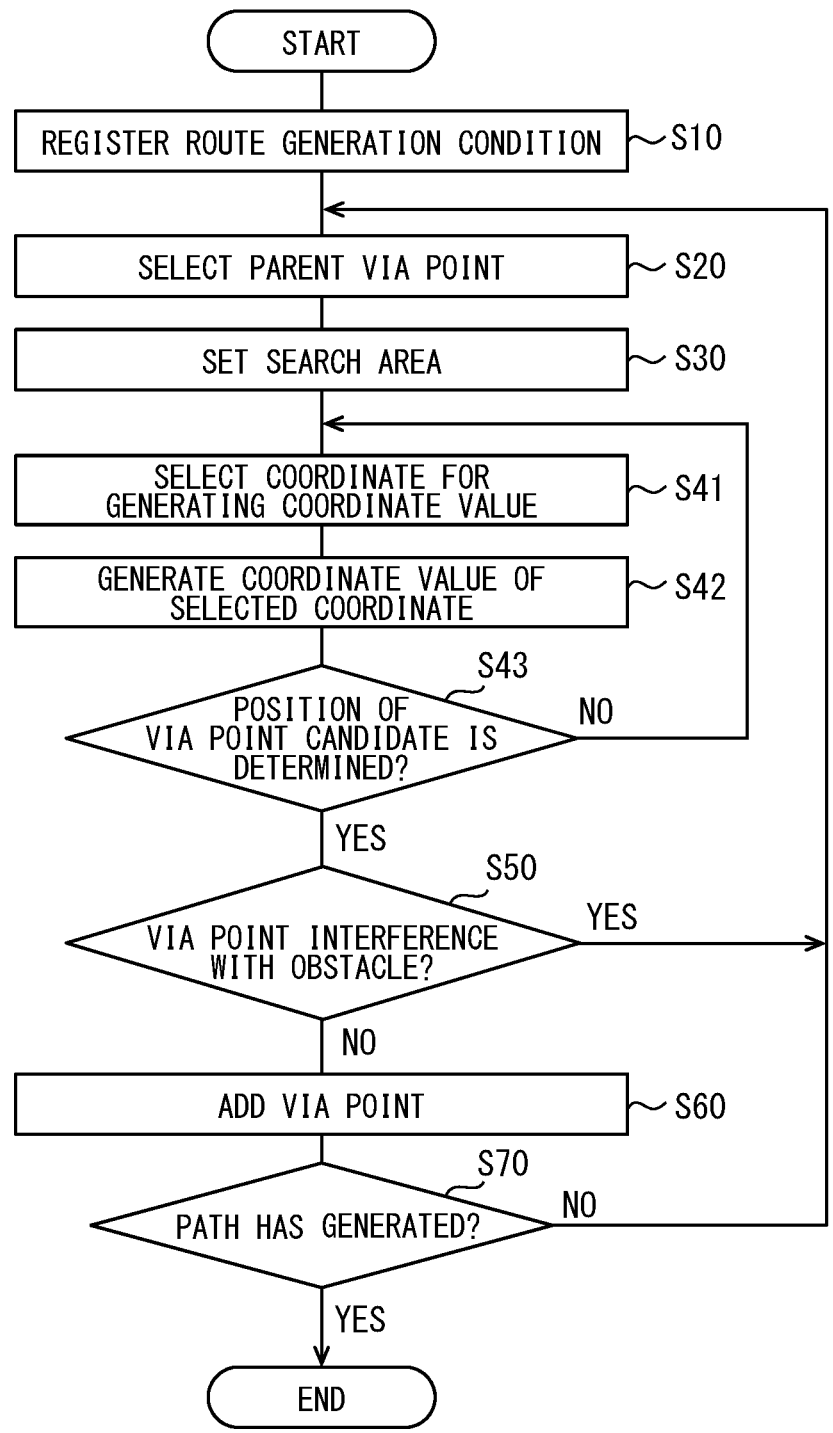
FIG. 17 is a flowchart showing processing to be executed by the processor.

FIG. 17 is a flowchart showing processing to be executed by the processor 440. In the flowchart of FIG. 17, S41, S42, and S43 are executed instead of S40 described in FIG. 4. S41 is a process executed by the coordinate selection unit 445, S42 is a process executed by the coordinate value determination unit 446, and S43 is a process executed by the via point candidate generation unit 444.

In S41, the coordinate for generating the coordinate values of the via point candidate Q is selected. The coordinate of the via point candidate Q is determined by the coordinate value of the angle RA1 and the coordinate value of the angle RA2. In S41, the coordinate for which the coordinate values are generated in the next S42 is selected from the coordinates for which the coordinate values of the via point candidate Q have not been determined. When neither coordinate is selected, the coordinate for which the coordinate values are selected can be randomly selected. Alternatively, the coordinate to be selected first may be determined in advance.

Figure 18:
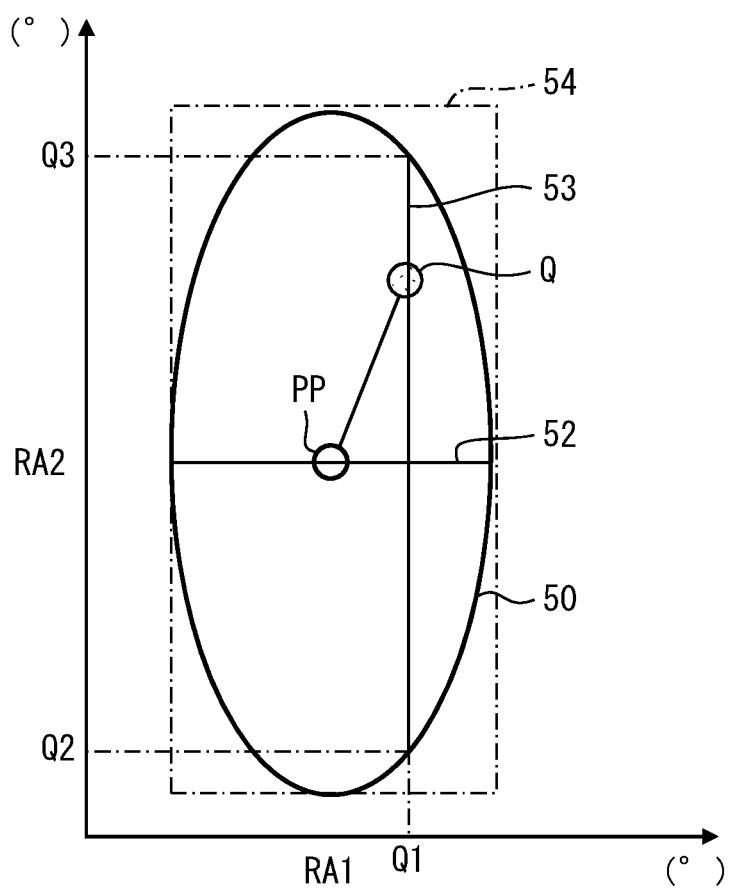
FIG. 18 is a diagram showing a process in which a processor generates a via point candidate.

In S42, the coordinate values of the coordinate selected in S41 are generated so as to be within the search area 50. A specific description will be given using FIG. 18 as an example. For example, suppose that the angle RA1 coordinate is selected in S41. In this case, a coordinate value is generated on a line segment 52 so that the via point candidate Q is included in the search area 50. Which coordinate value on the line segment 52 is randomly determined.

In S43, it is determined whether the position of the via point candidate Q is determined. That is, it is determined whether both the coordinate value of the angle RA1 and the coordinate value of the angle RA2 are generated as the coordinate values of the via point candidate Q. When the determination result at S43 is NO, the processing returns to S41. When the determination result at S43 is YES, the processing proceeds to S50.

The case of returning to S41 will be described. It is assumed that the coordinate of the angle RA1 is selected in the first S41, the coordinate of the angle RA2 is selected in the second S41. Subsequently, S42 is executed. It is assumed that the coordinate value of the coordinate of the angle RA1 of the via point candidate Q is Q1 in the first S42. In this case, in the second S42, the coordinate value of the angle RA2 is generated on the line segment 53 that is within the search area 50 on Q1. That is, the coordinate value of the angle RA2 is generated in the range from Q2 to Q3. The value in the range from Q2 to Q3 is randomly determined.

Unlike this fourth embodiment, as a comparative example, a case where the change angle of the first joint 21 and the change angle of the second joint 22 are independently determined to determine the via point candidate Q is considered. In this case, a via point candidate Q is randomly generated in a rectangle 54 shown in FIG. 18. The rectangle 54 has a portion outside the search area 50. Therefore, in the case of the comparative example, the coordinate obtained by independently determining the change angle of the first joint 21 and the change angle of the second joint 22 may be outside the search area 50. In this case, it is necessary to correct the coordinate or cancel the coordinate and redetermine the coordinate.

However, according to the fourth embodiment, the via point candidate Q is not generated outside the search area 50. Therefore, it is not necessary to correct or redetermine the position of the via point candidate Q, so that the motion path can be efficiently generated.

Although the embodiments of the present disclosure have been described above, the present disclosure is not limited to the above embodiments, and various modified examples described below are also included in the technical scope of the present disclosure. Furthermore, various modifications other than the following can be made without departing from the gist.

First Modification

For example, in the embodiments, a case where a motion path is generated for a robot 10 having two joints 21 and 22 has been described. Alternatively, the robot 10 that generates the motion path may have three or more joints. In the case where the robot 10 has three or more joints, it is not necessary to use the joint having the smallest movement amount SA of all shafts per unit change angle among the plurality of joints as the reference joint. For example, in the robot 10 having three joints, the joint having the second smallest movement amount SA of all shafts per unit change angle may be used as the reference joint.

Second Modification

In the embodiments and the first modification, the maximum movement amount at the time of searching for a via point is defined by the movement amount SA of all shafts when a predetermined reference joint among a plurality of joints, in which the movement amount SA of all shafts per unit change angle is not the maximum, changes by a specified maximum angle and the other joint is fixed. However, the method for determining the maximum movement amount during the via point search is not limited to the determination method disclosed in the embodiments and the first modification.

First Example for Second Modification

For example, the movement amount SA of all shafts when a change angle of each of all shafts is set to be smaller than the specified maximum angle may be set as the maximum movement amount at the time of searching for a via point. The robot 10 of the embodiment will be taken as an example, and the change angle will be 30 degrees to be described more specifically. In this case, the movement amount SA of all shafts is the size of the movement area A generated when the first shaft 11 is changed by 30 degrees and the second shaft 12 is changed by 30 degrees for each change angle of the first shaft 11.

Second Example for Second Modification

For example, the size of the movement area A when the angle of the first shaft 11 is changed by an angle smaller than the specified maximum angle in a state where the linear distance from the base end of the first shaft 11, that is, the first joint 21 to the tip of the second shaft 12 is the longest may be set as the maximum movement amount at the time of searching for a via point. The state in which the linear distance from the first joint 21 to the tip of the second shaft 12 is the longest is the state in which the movement area A becomes the largest when the first shaft 11 is rotated.

Here, the movement amount SA of all shafts when all the joints change by the specified maximum angle is defined as the maximum possible movement amount. The movement amount SA of all shafts in each of the first example and the second example of the second modification is smaller than the maximum possible movement amount. The maximum movement amount at the time of search is made smaller than the maximum possible movement amount. Thus, the search area 50 can be narrowed as compared with the case where the maximum movement at the time of search is the maximum possible movement amount.

Third Modification

Moreover, the second embodiment and the third embodiment may be combined. Moreover, the second embodiment and the fourth embodiment may be combined. Moreover, the third embodiment and the fourth embodiment may be combined.

Fourth Modification

The control device and the method therefor which have been described in the present disclosure may be also realized by a dedicated computer which constitutes a processor programmed to execute one or more functions concretized by computer programs. Also, the control device and the method therefor which have been described in the present disclosure may be also realized by a dedicated hardware logic circuit. Also, the control device and the method therefor which have been described in the present disclosure may be also realized by one or more dedicated computers which are constituted by combinations of a processor for executing computer programs and one or more hardware logic circuits. Further, the computer program may store a computer-readable non-transitional tangible recording medium as an instruction to be executed by the computer.

What is claimed is:

1. A motion path generation device configured to generate a motion path of a robot that has a plurality of joints and a plurality of shafts, adjacent two of the plurality of shafts being connected by a corresponding one of the plurality of joints, the motion path generation device comprising a processor configured to select, from a predetermined via point, a parent via point that is a source for searching for a next via point in a joint space, each axis of the joint space defining an angle of each of the plurality of joints, an attitude of the robot being represented by a coordinate in the joint space;

set a search area for searching for the next via point;

randomly generate a via point candidate that is a candidate of the next via point to be connected to the parent via point;

determine whether the via point candidate interferes with an obstacle; and add the via point candidate as a new via point in response to determining that the via point candidate does not interfere with the obstacle, wherein the processor sets the search area in the joint space by setting a change angle range of each of the plurality of joints such that an amount of movement of each shaft of the robot does not exceed a maximum movement amount in a working space of the robot and such that a total of an amount of movement of all of the plurality of shafts does not exceed the maximum movement amount in the working space of the robot, the maximum movement amount is defined as an amount of movement of at least one of the plurality of shafts which is smaller than a maximum possible movement amount, and the maximum possible movement amount is an amount of movement of all of the plurality of shafts when each of the plurality of joints changes by a specified maximum angle, wherein the processor randomly generates the via point candidate in the joint space within the change angle range of each of the plurality of joints, which is set as the search area to generate the motion path of the robot.

2. The motion path generation device according to claim 1, wherein when the search area includes an area in which one of the plurality of joints is configured to change the angle exceeding the specified maximum angle, the processor is further configured to adjust the search area by excluding a part of the area, wherein the processor generates the via point candidate in the adjusted search area.

3. The motion path generation device according to claim 1, wherein the via point for selecting the parent via point is provided by a plurality of via points, and as the number of times each of the plurality of via points has been selected as the parent via point increases, the processor reduces a probability of each of the plurality of via points for being selected as the parent via point.

4. The motion path generation device according to claim 1, wherein the processor is further configured to select a coordinate for determining a coordinate value from a coordinate for which a coordinate value of the via point candidate has not been determined, and determine the coordinate value of the selected coordinate such that the coordinate value is located within the search area, the processor selects a next coordinate until all of the coordinate values for determining a position of the via point candidate are determined, and when one of the coordinate values has been determined, the processor determines the coordinate value within an area that is limited by the one of the coordinate values and the search area.

5. The motion path generation device according to claim 1, wherein the processor sets as a weight value a reciprocal of a value based on a total number of times that is selected as a parent via point, and executes a weighted random sampling with the set weight value to select the parent via point from the predetermined via point.

6. The motion path generation device according to claim 1, wherein the specified maximum angle is defined by mechanical constraints of the robot or is defined to limit a distance between two adjacent via points in the joint space when the motion path is set.

7. A motion path generation method configured to generate a motion path of a robot that has a plurality of joints and a plurality of shafts, adjacent two of the plurality of shafts being connected by a corresponding one of the plurality of joints, the motion path generation method comprising;

selecting, from a predetermined via point, a parent via point that is a source for searching for a next via point in a joint space, each axis of the joint space defining an angle of each of the plurality of joints, an attitude of the robot being represented by a coordinate in the joint space;

setting a search area for searching for the next via point;

randomly generating a via point candidate that is a candidate of the next via point to be connected to the parent via point;

determining whether the via point candidate interferes with an obstacle; and adding the via point candidate as a new via point in response to determining that the via point candidate does not interfere with the obstacle, wherein the setting of the search area in the joint space includes setting of a change angle range of each of the plurality of joints such that a movement amount of each shaft of the robot does not exceed a maximum movement amount in a working space of the robot and such that an amount of movement of all of the plurality of shafts does not exceed a maximum movement amount, the maximum movement amount is defined as an amount of movement of at least one of the plurality of shafts which is smaller than a maximum possible movement amount in the working space of the robot, and the maximum possible movement amount is an amount of movement of all of the plurality of shafts when each of the plurality of joints changes by a specified maximum angle, wherein the via point candidate is randomly generated in the joint space within the change angle range of each of the plurality of joints, which is set as the search area to generate the motion path of the robot.

8. A non-transitory tangible computer readable storage medium comprising instructions executed by a processor of a motion path generation device, the motion path generation device configured to generate a motion path of a robot that has a plurality of joints and a plurality of shafts, adjacent two of the plurality of shafts being connected by a corresponding one of the plurality of joints, the instructions comprising:

selecting, from a predetermined via point, a parent via point that is a source for searching for a next via point in a joint space, each axis of the joint space defining an angle of each of the plurality of joints, an attitude of the robot being represented by a coordinate in the joint space;

setting a search area for searching for the next via point;

randomly generating a via point candidate that is a candidate of the next via point to be connected to the parent via point;

determining whether the via point candidate interferes with an obstacle; and adding the via point candidate as a new via point in response to determining that the via point candidate does not interfere with the obstacle, wherein the setting of the search area in the joint space includes setting of a change angle range of each of the plurality of joints such that a movement amount of each shaft of the robot does not exceed a maximum movement amount in a working space of the robot and such that an amount of movement of all of the plurality of shafts does not exceed a maximum movement amount, the maximum movement amount is defined as an amount of movement of at least one of the plurality of shafts which is smaller than a maximum possible movement amount in the working space of the robot, and the maximum possible movement amount is an amount of movement of all of the plurality of shafts when each of the plurality of joints changes by a specified maximum angle, wherein the via point candidate is randomly generated in the joint space within the change angle range of each of the plurality of joints, which is set as the search area to generate the motion path of the robot.

\* \* \* \* \*